(12) United States Patent
Nelson (10) Patent No.: US 8,595,182 B1
(45) Date of Patent: Nov. 26, 2013

(54) NETWORK FILE ASSOCIATION

(75) Inventor: Jeffrey Nelson, Mountain View, CA (US)

(73) Assignee: Google Inc., Mountain View, CA (US)

(*) Notice: Subject to any disclaimer, the term of this patent is extended or adjusted under 35 U.S.C. 154(b) by 924 days.

(21) Appl. No.: 12/267,314

(22) Filed: Nov. 7, 2008
(Under 37 CFR 1.47)

Related U.S. Application Data (60) Provisional application No. 60/986,271, filed on Nov. 7, 2007.

(51) Int. Cl.
*G06F 7/00* (2006.01)

(52) U.S. Cl.
USPC .......................................................... 707/602

(58) Field of Classification Search
USPC .......................... 707/602, 610, 635, 999.101
See application file for complete search history.

(56) References Cited

U.S. PATENT DOCUMENTS

| | | | |
|---|---|---|---|
| 5,701,423 A | 12/1997 | Crozier | |
| 5,832,489 A | 11/1998 | Kucala | |
| 5,889,942 A | 3/1999 | Orenshteyn | |
| 6,324,544 B1 | 11/2001 | Alam et al. | |
| 6,362,836 B1 | 3/2002 | Shaw et al. | |
| 6,952,714 B2 | 10/2005 | Peart | |
| 7,000,032 B2 * | 2/2006 | Kloba et al. | 709/248 |
| 2001/0028363 A1 * | 10/2001 | Nomoto et al. | 345/748 |
| 2002/0116416 A1 * | 8/2002 | Tesch et al. | 707/516 |
| 2003/0115219 A1 * | 6/2003 | Chadwick | 707/200 |
| 2006/0230030 A1 * | 10/2006 | Volpa et al. | 707/3 |
| 2007/0220417 A1 * | 9/2007 | Mathew et al. | 715/511 |
| 2008/0082575 A1 * | 4/2008 | Peter et al. | 707/103 Z |
| 2008/0126080 A1 * | 5/2008 | Saldanha et al. | 704/9 |
| 2008/0147787 A1 * | 6/2008 | Wilkinson et al. | 709/203 |
| 2008/0235281 A1 * | 9/2008 | Holm et al. | 707/104.1 |
| 2009/0083449 A1 * | 3/2009 | Mashinsky | 710/8 |
| 2011/0047195 A1 * | 2/2011 | Le et al. | 707/827 |

OTHER PUBLICATIONS

Schonfeld, E., "DocSyncer Bridges Your Desktop With Google Docs," *TECHRUNCH*, published on Oct. 15, 2007, downloaded from http://www.techcrunch.com/2007/10/15/docsyncer-bridges-your-desktop-with- google-docs on Jun. 5, 2009; 3 pages.

* cited by examiner

*Primary Examiner* — Mohammed R Uddin
(74) *Attorney, Agent, or Firm* — Sterne, Kessler, Goldstein & Fox P.L.L.C.

(57) ABSTRACT

The present invention relates to systems and methods for file association over a network. In an embodiment, a computer-implemented method for file association over a network includes determining a file type associated with a requested file and determining an uploader corresponding to a file type of the requested file. The method further includes executing the determined uploader in order to call at least one remote application associated with the file type of the requested file. In another embodiment, a system for making a file association over a network is provided. The system includes a file type mapper, at least one uploader, and an uploader data structure. In a further embodiment, a system for making a file association over a network includes a file type mapper, a universal uploader, and a universal uploader data structure.

16 Claims, 6 Drawing Sheets

FIG. 1

| FILE TYPE | UPLOADER IDENTIFIER |
|---|---|
| DOC | UPLOADER1.EXE |
| PPT | UPLOADER2.EXE |
| GIF | UPLOADER3.EXE |
| WAV | UPLOADER4.EXE |

| FILE TYPE | UPLOADER IDENTIFIER |
|---|---|
| DOC | UNIVERSAL_UPLOADER.EXE |
| PPT | UNIVERSAL_UPLOADER.EXE |
| GIF | UNIVERSAL_UPLOADER.EXE |
| WAV | UNIVERSAL_UPLOADER.EXE |

| FILE TYPE | APPLICATION IDENTIFIER |
|---|---|
| DOC | REMOTE APPLICATION 1 |
| PPT | REMOTE APPLICATION 2 |
| GIF | REMOTE APPLICATION 3 |
| WAV | REMOTE APPLICATION 4 |

NETWORK FILE ASSOCIATION

BACKGROUND

1. Field of the Invention

The present invention relates to computer networking and files.

2. Background Art

Personal computers and mobile devices require specific applications to create and edit a variety of file types. These types of files can include, but are not limited to, documents, spreadsheets, presentation slides, pictures, web documents, audio files or video files. Some files are more specialized and thus require more specialized applications. The applications required to edit each of these files have increased in number, size and complexity. The operating systems required to run these applications have also increased in size. This has resulted in a greater need for processing power and memory, which is a particular concern for designers and users of smaller computers and mobile devices.

In a common conventional approach, the creation and modification of these files takes place locally, that is, on a computing device such as a client device which may or may not be connected to a network. An operating system of the local device manages these files so that they can be represented in a directory folder and associated with a file identifier or icon. Each file is also associated with a local application that can be used to modify the file. This local application resides on the local device and uses the local operating system. The operating system may associate a file with a local application based on the file extension or on information about the type of file.

To view or edit a document, a user can open the file by using the menu of its associated local application or by selecting its file identifier or icon. If the user double-clicks on the file identifier, the operating system opens the file in the local application that is associated with the file. If a user wants to create a file, the user opens the local application associated with that type of file and proceeds to create a new file. It is common to have several files, possibly of different types, open at a time. The user then proceeds to view or edit one or more files. When the user closes a file or exits an application, the file and its corresponding file identifier are saved on the local device.

The user can also save the file on a network drive or on a different computer. Network file systems can provide for a file to be stored on the local client, a server, or a storage device. Sometimes files may be distributed across a number of network drives or servers. Nevertheless, the files are opened and edited in the local application on the local client or computer. Any temporary files that the operating system creates for the file are also local.

Some files may be opened in another application, such as in a web browser. These files are identified as being linked to another file on the network through a uniform resource locator (URL). However, these files are merely webpages, or files edited and stored by the owner of the website. If a user does edit something through a web browser, it is usually in an email, a blog or the content of a personal web space. Such files are stored on a network server but are only accessible by navigating the Internet to get to the email account or personal web space. Such files are not directly associated with a file directory on the local device. They are separate and apart from the files in the local file directory. As for the files which are in the local directory, they require the local application's functionality. But, as mentioned earlier, these local applications and the operating systems that house them continue to increase in size and complexity. They also require periodic updates.

Some processing work and applications are being moved from the local device to servers on a network. The Google Docs service, at the present time, is a web-based word processing, spreadsheet, and presentation service available from Google, Inc. of Mountain View, Calif. that makes collaboration more efficient. Among other things, it lets a user keep a document online so that it can be edited from any internet-connected computer. A user can create new documents or start from an existing file saved on his or her local computer by uploading the document and picking up where he or she left off. Each revision is automatically saved online. To work on documents offline or distribute them as attachments, a user may save a copy of the Google file to his local computer in the format that works best for him. In addition, the user can view his online files in a directory structure from a central webpage.

However, these online files are not associated with a local file or local file identifier over the network. For a local file to be copied to the network, it has to be affirmatively uploaded from a webpage. Any online files remain online unless affirmatively saved by the user on the local computer as a local file. Once saved as a local file, the file is not electronically associated with the online application and is indistinguishable from other files on the local directory. If a user selects this local file, it is opened in the local application without any apparent link to the remote application it may have come from. If any changes are made to the local file, it is out of sync with the online file of the same name.

SUMMARY

The present invention relates to systems and methods for file association over a network. In an embodiment, a computer-implemented method for file association over a network includes determining a file type associated with a requested file and determining an uploader corresponding to a file type of the requested file. The method further includes executing the determined uploader in order to call at least one remote application associated with the file type of the requested file.

In another embodiment, a system for making a file association over a network is provided. The system includes a file type mapper, at least one uploader, and an uploader data structure. The file type mapper accesses the uploader data structure to determine which uploader to execute based on a file type of a requested file. In an example, the uploader can then call a corresponding remote application to host the requested file.

In a further embodiment, a system for making a file association over a network includes a file type mapper, a universal uploader, and a universal uploader data structure. The file type mapper accesses the universal uploader data structure to execute the universal uploader. In an example, the universal uploader can then initiate at least one remote application to host the requested file.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein pertain to a file association over a network. In a file association over a network, a file may be associated with a file identifier. A file identifier can be any means of file representation including a desktop icon or a filename within a folder or directory. The file identifier can be displayed on the local device while the file can reside either on the local device or on the network. Because of the association between a file and its file identifier, a file can be opened by selecting its associated file identifier. A file identifier can be selected in a number of ways including by mouse, audio command, keypad, dial, clickwheel or other user-interface input. These examples are not meant to be exclusive. The file or file identifier can be displayed, manipulated, modified or selected in any other manner appreciated by those skilled in the relevant art(s) without departing from the scope and spirit of the invention.

Figure 1:
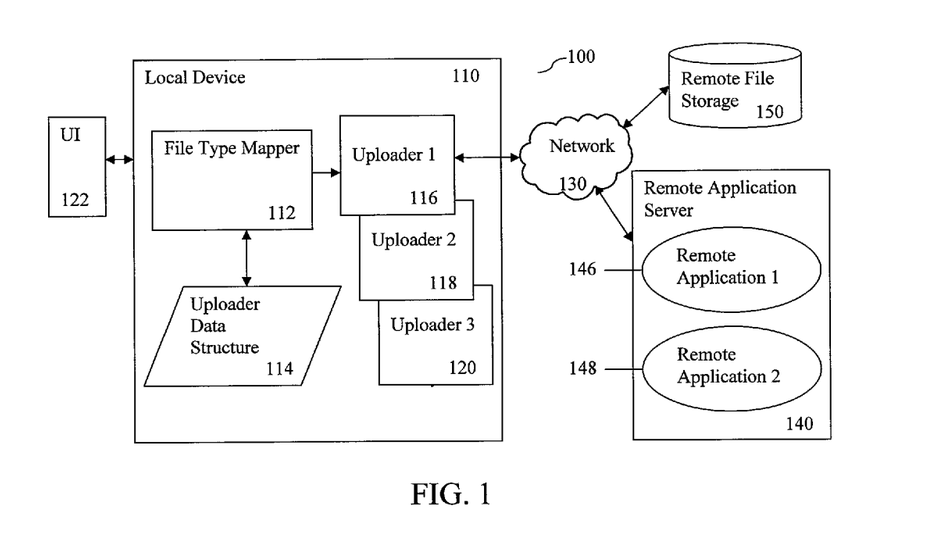
FIG. 1 illustrates a system for making a file association over a network, according to an embodiment of the present invention.

FIG. 1 illustrates an exemplary system 100 for a file association over a network, according to an embodiment of the present invention. System 100 shows a local device 110, a remote application server 140 and remote file storage 150. Local device 110, remote file storage 150 and remote application server 140 may be connected through network 130. Remote application 1 146 and remote application 2 148 reside and run on remote application server 140. Remote application 1 146 and remote application 2 148 are representative of any number of remote applications. These remote applications could involve or include computer program logic recorded on a tangible computer readable medium. A file's information and content may be stored on remote file storage 150, which can be a database or any other storage device for storing files. The term "remote" is used to describe that it is physically separate from the local device or located on the network or Internet.

According to an embodiment of exemplary system 100, local device 110 may include file type mapper 112. Other embodiments can include uploader data structure 114 and a number of uploaders represented by uploader 1 116, uploader 2 118 and uploader 3 120. File type mapper 112 accesses uploader data structure 114 to determine which uploader to execute based on a file type of a requested file. A user interface 122 may also be coupled to local device 110.

An uploader can initiate or run a remote application that is associated with a selected or requested file. The term "run" can include launching or starting a remote application. If the remote application is already running, run can be used to describe the point when a running application begins to host the selected file.

The uploader may also receive the contents of a file from the network if the file contents are stored remotely. According to another embodiment, an uploader could convert a locally stored file into another format so that it can be hosted by a remote application. In yet another embodiment, an uploader may also initiate a file content display. In another embodiment, an uploader can provide a certain level of functionality in order to enable a user to view and modify a file that is uploaded by an uploader. This functionality may be similar but separate from the functionality provided by a local application. An uploader can be implemented using software, hardware, firmware or any combination thereof.

Figure 2:
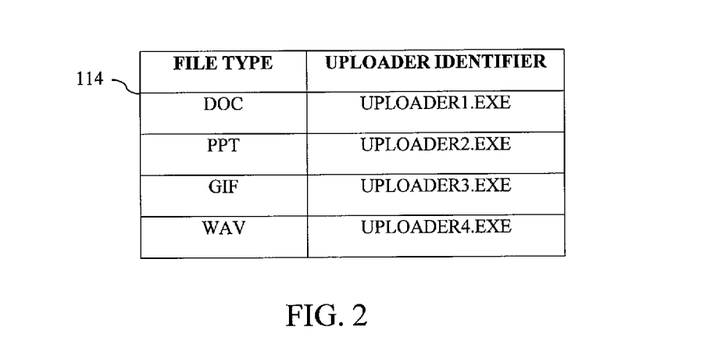
FIG. 2 illustrates a data structure used for making a file association over a network, according to an embodiment of the present invention.

FIG. 2 shows uploader data structure 114, according to an embodiment. Uploader data structure 114 may be a table or any other relational data structure used to correspond a file type with an uploader. For example, the uploader data structure 114 shown in FIG. 2 shows that a DOC file type is associated with uploader 1 116 and files of type PPT are associated with uploader 2 118. Other file types will be associated with other uploaders in a manner similar to the embodiment illustrated in FIG. 2.

Figure 3:
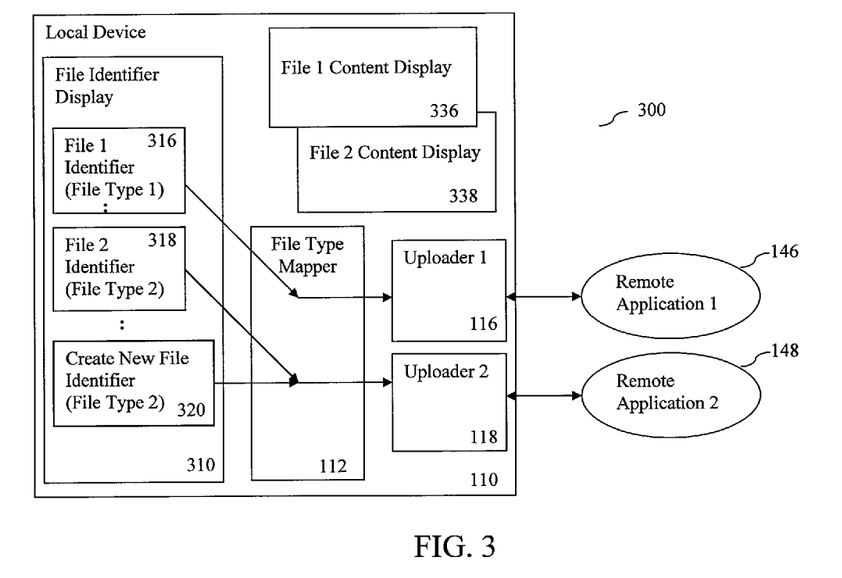
FIG. 3 illustrates a system for making a file association over a network, according to an embodiment of the present invention.

The operation of system 100 and its components is described further below with respect to an example shown in FIG. 3. FIG. 3 illustrates an exemplary system 300, according to an embodiment. In this example, local device 110 may include a file identifier display 310. File identifier display 310 may display one or more file identifiers. For instance, file identifier display 310 can display file 1 identifier 316 of file type 1 and file 2 identifier 318 of file type 2. These file identifiers can be icons or any other file characteristic used for file identification such as a text name, link, or other characteristic. Create new file identifier 320 is representative of a means for creating a new file or for identifying a remote application for creating a new file. The remote application for creating a new file can be chosen based on what type of file the new file will be. For example, create new file identifier 320 can be used to create a new file of file type 2.

Local device 110 may include one or more file content displays represented by file 1 content display 336 and file 2 content display 338. Such displays can be used for displaying and modifying the content of a file. Other embodiments may include additional display screens.

According to an embodiment, local device 110 can include file type mapper 112, uploader 1 116 and uploader 2 118. File type mapper 112 can be used to determine an uploader associated with a file type using uploader data structure 114. Each uploader in turn may run an associated remote application that will host the file. For example, file 1 identifier 316 will run remote application 146 for file type 1. File 2 identifier 318 is associated with remote application 148 for file type 2. Create new file identifier 320 is also associated with remote application 148 for file type 2. Other identifiers may likewise be associated with other associated remote applications.

As mentioned earlier, these associations can be made based on file type. For example, a word processing document is selected. When the word processing document is selected, with network file association, it may be displayed on the local device, but the application, with its full functionality, is provided by the remote application that is assigned to that file type. When the application is closed, any remaining changes are transmitted and the file is stored remotely. At that time, the remote application associated with that file type may be closed or idle. Sometimes it may be better to convert the file from the original word processing document type to another text file type. This may assist the remote application which is hosting the file. The user could be provided the option of saving the file in the original word processing format or in the new text file type. This may also help a user to migrate from a first file format to another file format supported by the remote application.

In another embodiment, the user can predetermine whether or not the selected file will be opened with the local application or a remote application. Therefore, when the file is selected, the user can automatically have the file displayed and modified in the application of his or her choice.

According to an embodiment, a file may reside on the network. For example, file 1 identifier 316 is requested. File type mapper 112 chooses uploader 1 116, which runs remote application 146 to enable a user to view and modify the requested file associated with file identifier 316. The contents of selected file 316 may be stored in remote file storage 150. The content of selected file 316 is transmitted from remote application 146 to local device 110 to be displayed in file content display 336. Any changes made by the user on local device 110 are transmitted back to remote application 146 and stored on remote file storage 150. Any updates to the associated application may be performed on remote application 146. This is in contrast to a local application which runs substantially or completely on the local device and must be updated on the local device.

According to another embodiment, a file may originally exist on the local device. For example, file 1 identifier 316 is requested. File type mapper 112 chooses uploader 1 116, which runs remote application 146 to enable a user to view and modify the requested file associated with file identifier 316. The contents of the requested file, which are stored on local device 110, are transmitted from local device 110 to remote application 146. According to some embodiments, the file may be converted from its original format into another format suitable for purposed of being hosted by remote application 146. The file content will be displayed in file content display 336. Any changes made by the user on local device 110 may be transmitted back to remote application 146 and stored on remote file storage 150. The user may choose that the file be opened automatically in remote application 146 upon future selection of its file identifier 316.

Figure 4:
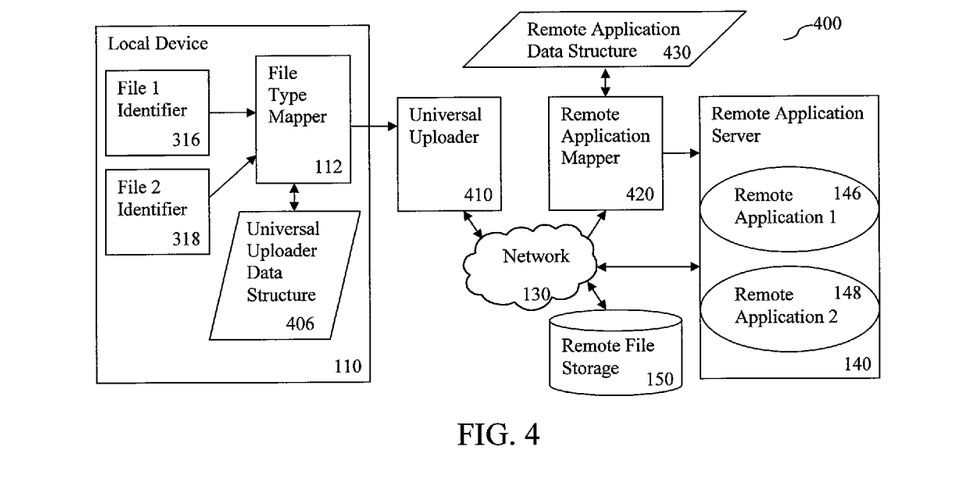
FIG. 4 illustrates a system for making a file association over a network, according to an embodiment of the present invention.

FIG. 4 illustrates an exemplary system 400 for making a file association over a network, according to another embodiment of the present invention. System 400 includes local device 110, universal uploader 410, remote application mapper 420, remote application server 140 and remote file storage 150. These element are connected over network 130. Remote application mapper 420 is coupled to remote application data structure 430.

Figure 5:
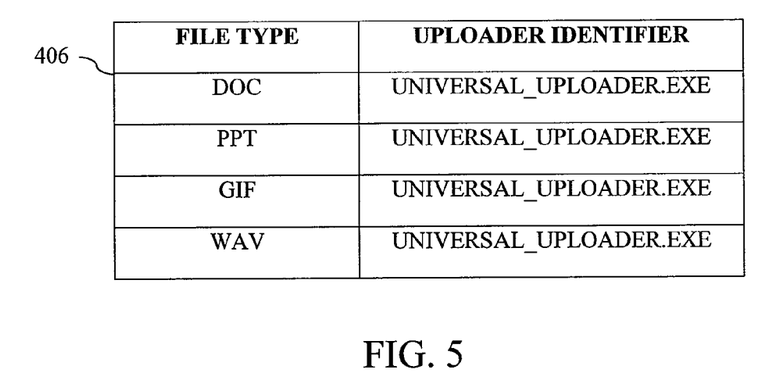
FIG. 5 illustrates a data structure used for making a file association over a network, according to an embodiment of the present invention.

Local device 110 includes file 1 identifier 316, file 2 identifier 318, file type mapper 112 and universal uploader data structure 406. In exemplary system 400 involving a universal uploader 410, according to an embodiment, file types are not associated with their own respective uploader. Rather, the file types are all associated with universal uploader 410 which will determine a remote application to host each file. For example, FIG. 5 illustrates an embodiment of universal uploader data structure 406. Here, each file type is associated with universal uploader 410.

Figure 6:
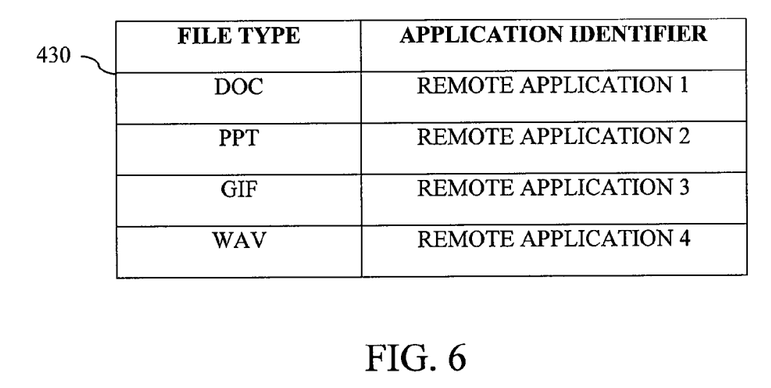
FIG. 6 illustrates a data structure used for making a file association over a network, according to an embodiment of the present invention.

Universal uploader 410 determines a remote application to host a requested file using remote application mapper 420. Remote application mapper 420 uses remote application data structure 430. For example, FIG. 6 illustrates an embodiment of remote application data structure 430 in which each file type is associated with a remote application. As shown in this example, a DOC file type is associated with remote application 1 146 which will host DOC files. A PPT file is likewise associated with remote application 2 148. These examples and these files are not limiting. Other file types may be associated with other remote applications.

In a further embodiment, universal uploader 410 can also act to upload and transmit file information and content to local device 110 from remote application server 140 and remote file storage 150. It can also receive updated file content and information from local device 110 and transmit the content and information back to remote application server 140 and remote file storage 150.

According to another embodiment, universal uploader 410 may also be part of a web browser which opens up or switches to requested file 316. In this embodiment, file 316 is displayed in the web browser 410 on file content display 336 but hosted by remote application 1 146. In this case, there is a direct association between selected file 316 on display 336 and remote application 1 146. Any new or modified file is automatically represented on local device 110 but stored on remote file storage 150 after web browser 410 closes. File type mapper 112 may assist in file association by identifying the correct uniform resource locator (URL) for the web browser to request based upon the file type of the selected file. Requested file 316 may also be converted into another file format or to a URL in order for the file to be viewed in a web browser or hosted remotely.

Figure 7:
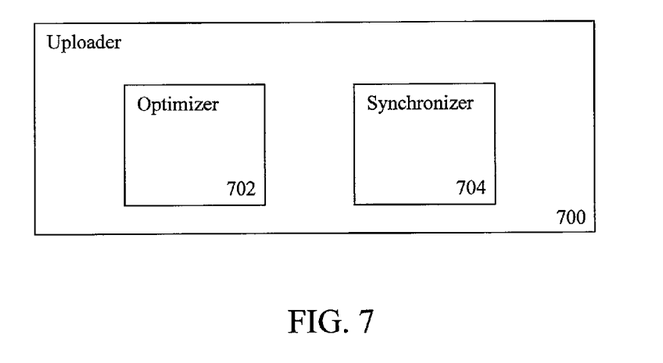
FIG. 7 illustrates a system for making a file association over a network, according to an embodiment of the present invention.

FIG. 7 shows another embodiment having an uploader 700. Uploader 700 may include an optimizer 702 and/or a synchronizer 704. Optimizer 702 and synchronizer 704 can be implemented in software, hardware, firmware or any combination thereof. These features can perform many functions. Optimizer 702 can be configured to optimize the file properties, application functionality, or amount of traffic between the local device and remote applications, in order to provide optimal conditions for viewing or modifying the file. Synchronizer 704 can be configured to make sure a current or accurate version a selected file is being provided to local device 110. This may include creating and comparing one or more file checksums for providing or obtaining a correct version a selected file. The term correct may refer to an accurate or current version of a selected file. It may also refer to a requested or desired version of the file.

Figure 8:
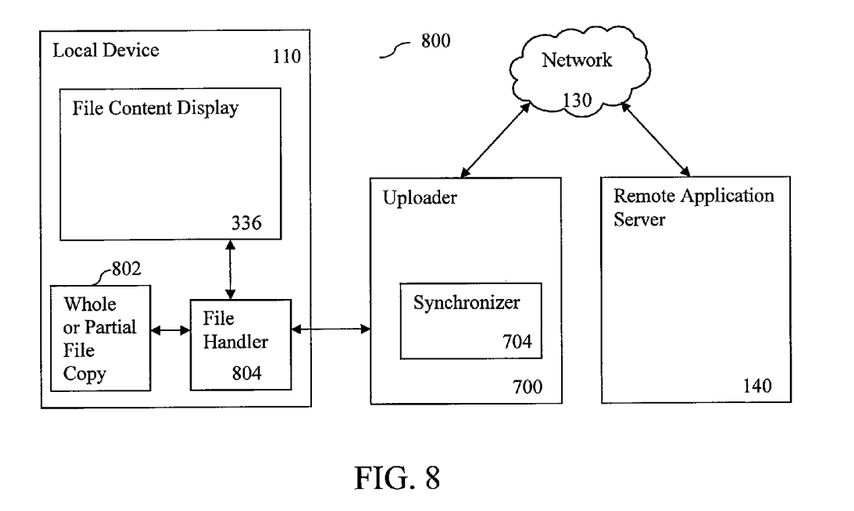
FIG. 8 illustrates a system for making a file association over a network, according to an embodiment of the present invention.

FIG. 8 illustrates an exemplary system 800 for making a file association over a network, according to an embodiment of the present invention. Local device 110 is connected to uploader 700 over the network and includes file content display 336, file handler 804 and whole or partial file copy 802.

Uploader 700 is connected over the network to remote application server 140. Uploader 700 may include synchronizer 704. In an embodiment, file copy 402 and file handler 404 act together to provide a copy of the file when local device 110 is not connected to the network. File handler 804 can also be implemented in software, hardware, firmware or any combination thereof.

Figure 9:
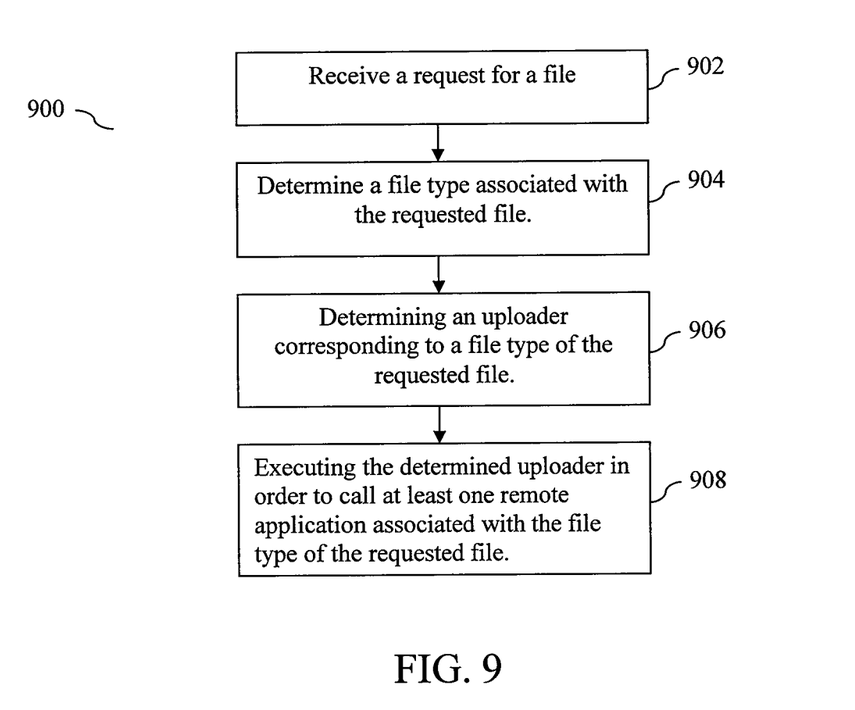
FIG. 9 shows a flowchart illustrating a method for making a file association over a network and synchronizing files, according to an embodiment of the present invention.

FIG. 9 illustrates an exemplary method 900 for making a file association over a network, according to an embodiment of the present invention (Steps 902-908). A request for a file is received in step 902. In step 904, a file type associated with the requested file is determined. In step 906, an uploader corresponding to a file type of the requested file is determined. In an embodiment, steps 904 and 906 could be performed by file type mapper 112. File type mapper 112 could perform steps 904 and 906 by accessing uploader data structure 114 or universal uploader data structure 406. In step 908, a determined uploader is executed. This could be also performed by file type mapper 112. The determined uploader may call at least one remote application. The remote application may be associated with the file type of the requested file.

Figure 10:
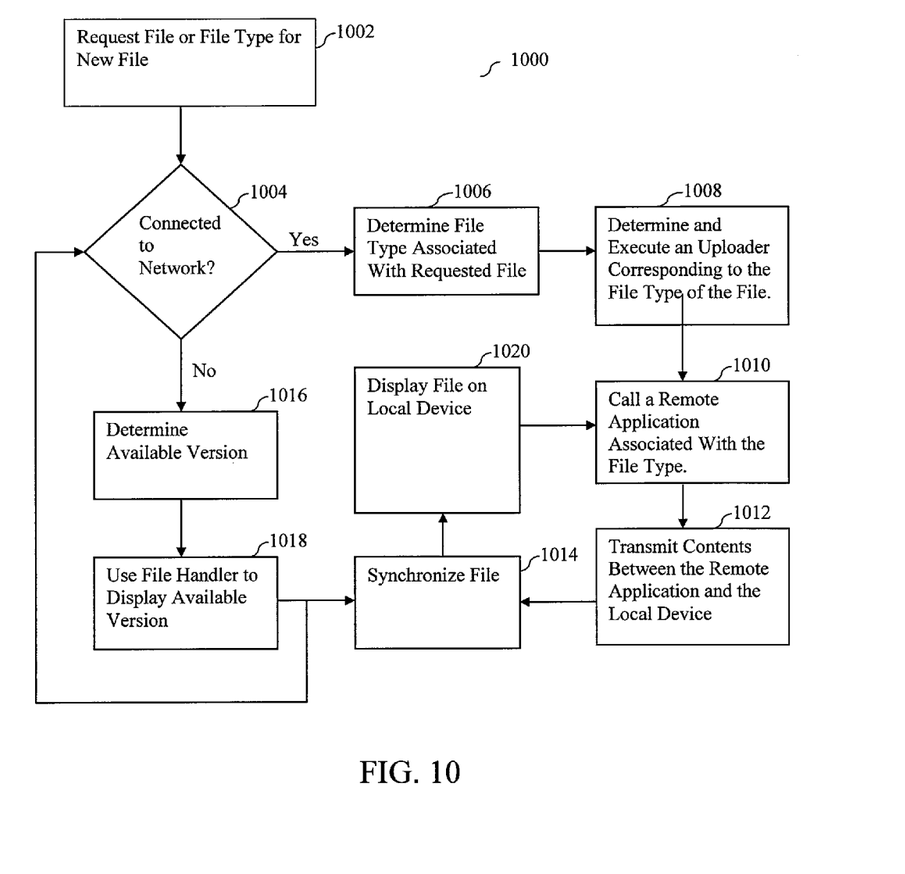
FIG. 10 shows a flowchart illustrating a method for making a file association over a network, according to an embodiment of the present invention.

FIG. 10 shows a flowchart 1000 for making a file association over a network, according to an embodiment of the present invention. Step 1002 begins with selecting a file or an application to create a new file of a certain file type. Next, it is determined whether the local device 110 is connected to the network 1004. If local device 110 detects a connected status, according to an embodiment, then it determines a file type associated with requested file 1006. An uploader is determined according to the file type of the requested file and then executed 1008. The uploader will then proceed to call the appropriate remote application to host the requested file 1010. The remote application is associated with the file type. Step 1012 involves transmitting the file contents between local device 110 and the remote application. Step 1014 involves synchronizing the file. The file is then displaying on the local device 1020. According to an embodiment, steps 1010 through 1014 can repeat.

If a network connection is not detected, according to an embodiment, then step 1016 involves determining an available version. Whole or partial copy 802 and file handler 804 may be used to display an available version 1018. The available file or whole or partial copy 802 may have been previously stored on local device 110. The available file or whole or partial copy 802 may or may not be synchronized to provide the most current available version 1014. The file is then displayed 1020. Step 1004 may be repeated until a network connection is detected.

According to an embodiment, if a connected status is detected subsequent to an unconnected status, file information of the requested file may be received. Steps 1006 through 1012 can then take place. At step 1014, the correct file or portion of the file received from the network is synchronized with the available version or copy 802. The file is then displayed 1020. In another embodiment, the steps 1012 and 1014 occur without a substantial interruption to the user. In another embodiment, steps 1012 and 1014 occur while the user is viewing and modifying the selected file.

In embodiments described herein, files may exist in directories or in any variety of file structures. File associations over the network may also apply to the directories of the files. Therefore, according to embodiments of the present invention, file directories and file organization structures may also be associated over the network similar to the embodiments described above.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method of a file association over a network, comprising:
   receiving a request for a file on a local device, wherein the local device comprises a file type identifier, a file type mapper and a plurality of uploaders;
   determining a file type associated with the requested file;
   determining, by the file type mapper, an uploader corresponding to the file type of the requested file from the plurality of uploaders based on uploader data structure, wherein the determined uploader corresponds to at least one remote application among a plurality of remote applications, and wherein each remote application corresponds to the file type and the remote application corresponding to the determined uploader is associated with the file type of the requested file;
   executing the determined uploader in order to upload the requested file and call the at least one remote application among the plurality of remote applications to host the uploaded requested file; and
   converting the requested file from a first file format to a second file format in order to be hosted by the at least one remote application.

2. The computer-implemented method of claim 1, comprising opening a file content window to fulfill the request for the file.

3. The computer-implemented method of claim 2, further comprising enabling a user to view and modify the file through the file content window.

4. The computer-implemented method of claim 1, further comprising enabling a user to determine whether the requested file will be opened automatically upon request in a local application or a remote application.

5. The computer-implemented method of claim 1, further comprising optimizing application functionality and data flow between a local device and the at least one remote application in order to provide optimal conditions for viewing and modifying the selected file through the local device.

6. The computer-implemented method of claim 1, further comprising:
   storing at least a partial copy of the requested file on a local device;

determining a status of a network connection between the local device and the at least one remote application;

determining an available version of the requested file on the local device upon detecting an unconnected status; and displaying the available version of the requested file in the content window on the local device.

7. The computer-implemented method of claim 6, wherein upon detecting a connected status of the network connection subsequent to an unconnected status, further comprising synchronizing the available version of the requested file with the version of the requested file hosted by the at least one remote application in order to display a correct version of the requested file on the local device.

8. The computer-implemented method of claim 7, wherein the requested file is modifiable during the synchronizing step.

9. A system for making a file association over a network, comprising:

receiving a request for a file on a local device, wherein the local device comprises a file type identifier, a file type mapper and a plurality of uploaders;

a file type mapper executed on one or more client computing devices;

at least one uploader implemented by the one or more client computing devices having one or more processors;

an uploader data structure residing on the one or more client computing devices, wherein the file type mapper accesses the uploader data structure to determine which uploader to execute based on a file type of a requested file and wherein the determined uploader is configured to upload the requested file and initiate at least one remote application corresponding to the determined uploader, among a plurality of remote applications executed on one or more server computing devices to host the uploaded requested file; and converting the requested file from a first file format to a second file format in order to be hosted by the at least one remote application.

10. The system of claim 9, further comprising the at least one remote application initiated by the uploader to host the requested file, wherein the at least one remote application is associated with the requested file.

11. The system of claim 9, comprising a synchronizer for synchronizing versions of the requested file.

12. The system of claim 9, comprising an optimizer for optimizing application functionality and data flow in order to provide optimal conditions to the user for viewing and modifying the requested file.

13. A system for making a file association over a network, comprising:

receiving a request for a file on a local device, wherein the local device comprises a file type identifier, a file type mapper and a plurality of uploaders;

a file type mapper executed on one or more client computing devices;

a universal uploader implemented by a computing device having a processor;

a universal uploader data structure, residing on the one or more client computing devices, wherein the file type mapper accesses the universal uploader data structure to execute the universal uploader;

a remote application mapper that accesses a remote application data structure, to determine at least one remote application associated with a file type of a requested file from a plurality of remote applications, wherein the universal uploader calls the at least one remote application executed on one or more server computing devices to host the requested file; and converting the requested file from a first file format to a second file format in order to be hosted by the at least one remote application.

14. The system of claim 13, comprising a synchronizer for synchronizing versions of the requested file.

15. The system of claim 13, comprising an optimizer for optimizing application functionality and data flow in order to provide optimal conditions to the user for viewing and modifying the requested file.

16. The system of claim 13, comprising a file handler for displaying a whole or partial copy of the requested file on a local device upon detecting an unconnected status between the local device and a network.

* * * * *